(No Model.) 5 Sheets—Sheet 2.
C. H. UHLER.
HEATING FEED WATER.
No. 436,845. Patented Sept. 23, 1890.
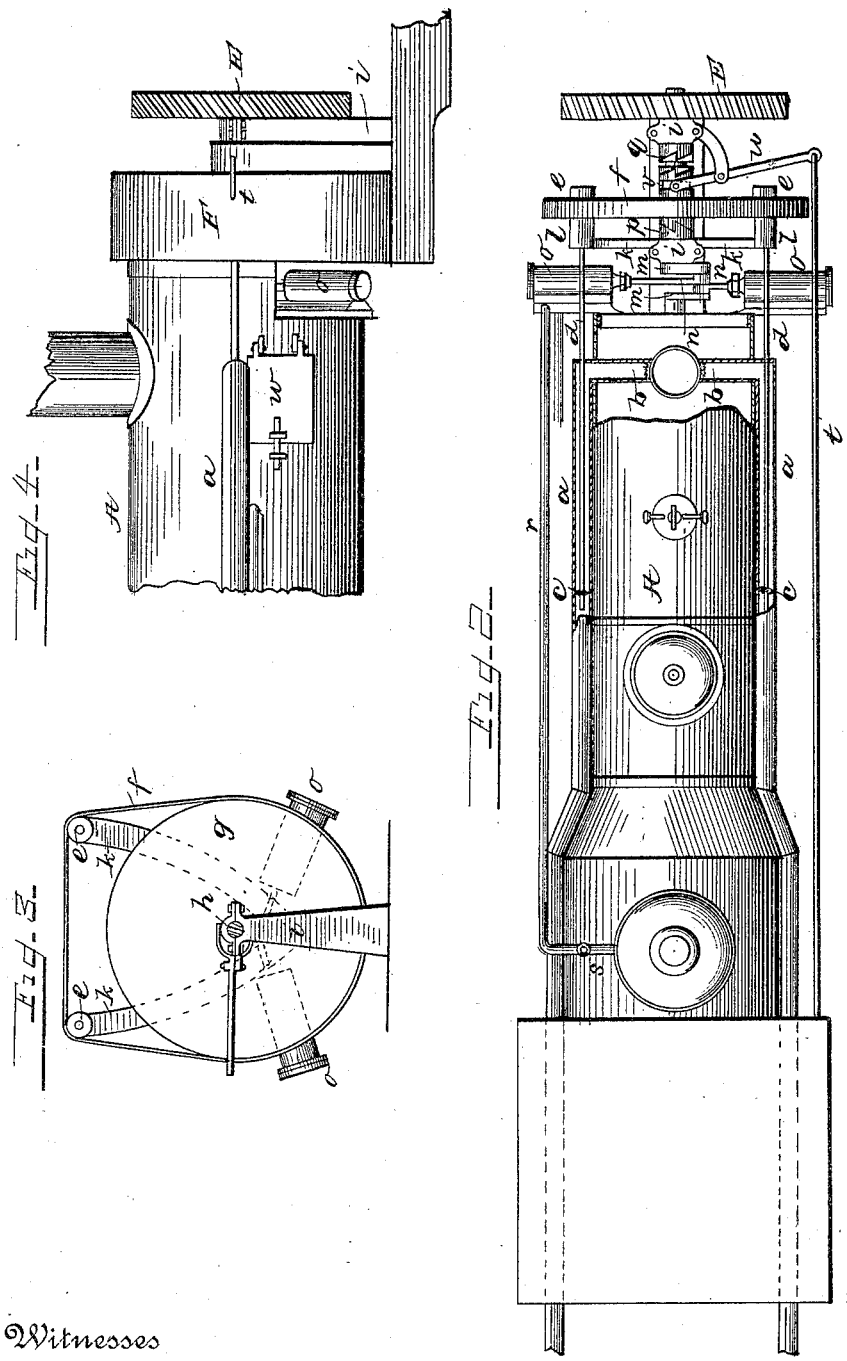
Witnesses
G. A. Tauberschmidt
O. L. Baker
Inventor
C. H. Uhler
By his Attorneys
Johnston, Reinohl & Dyre

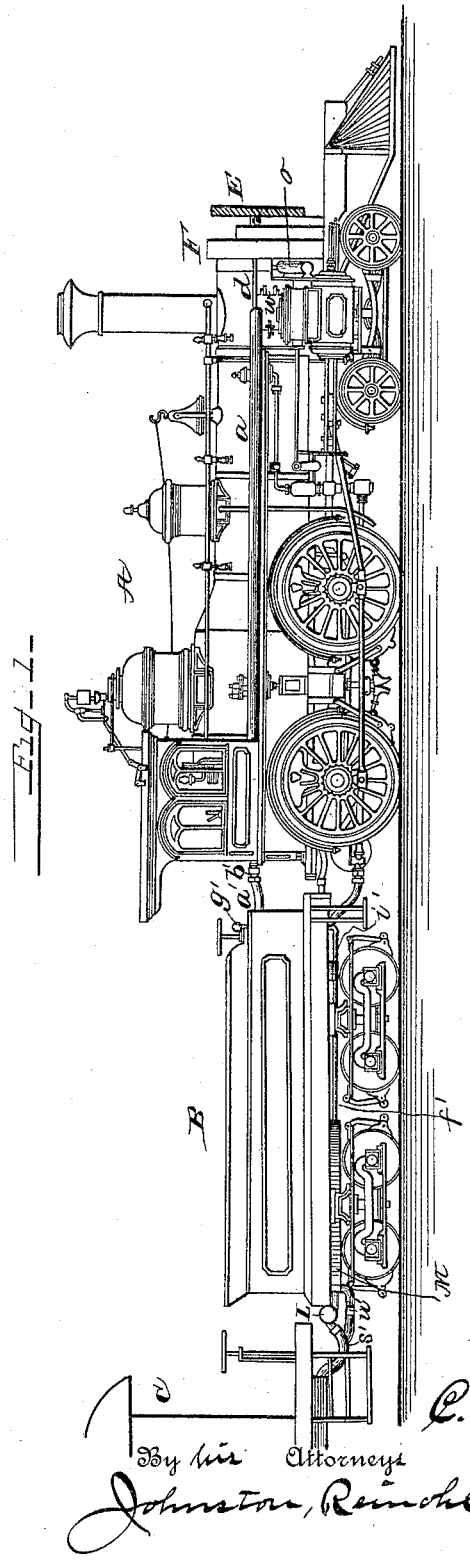

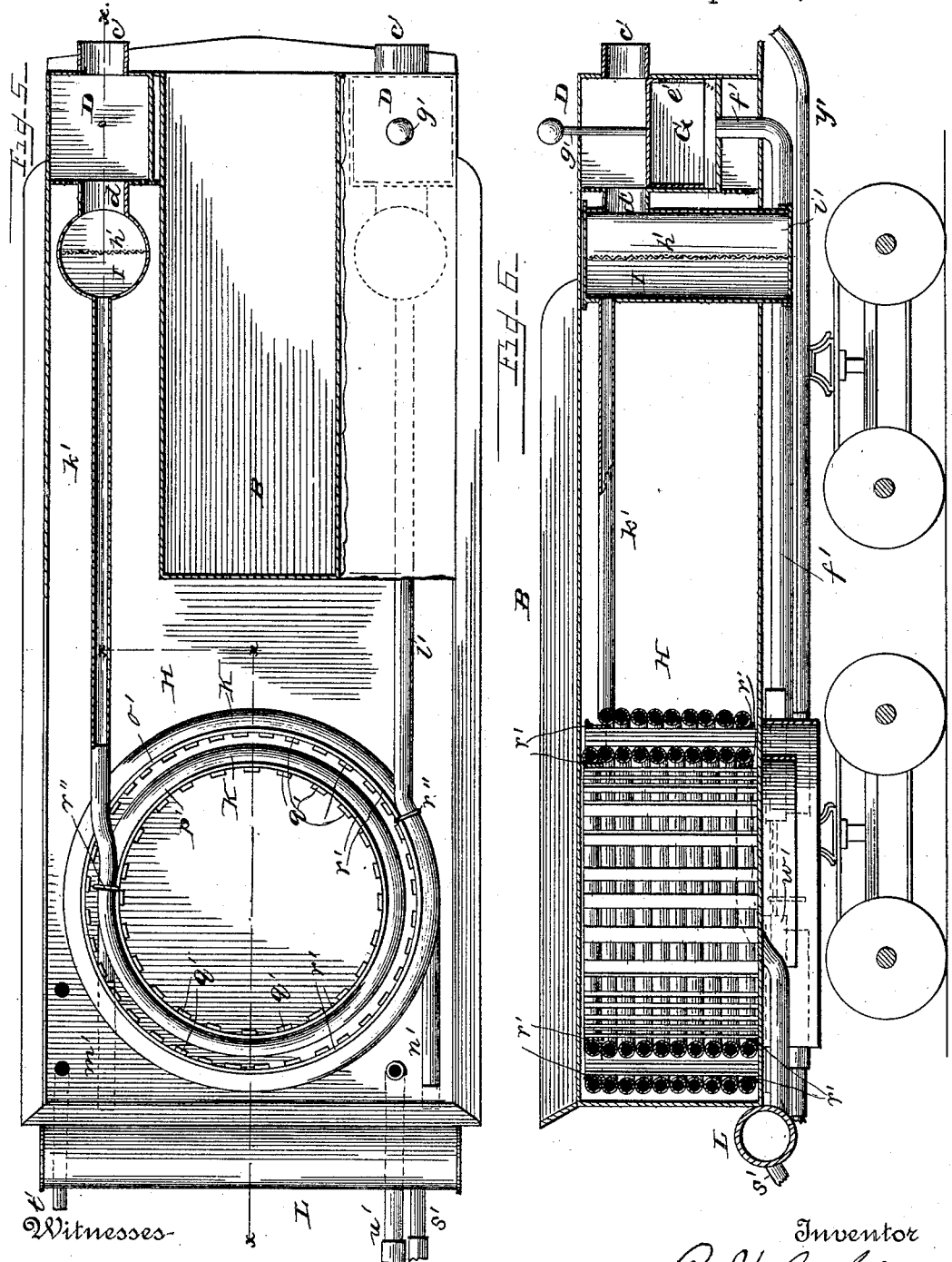

(No Model.) 5 Sheets—Sheet 4.
C. H. UHLER.
HEATING FEED WATER.
No. 436,845. Patented Sept. 23, 1890.
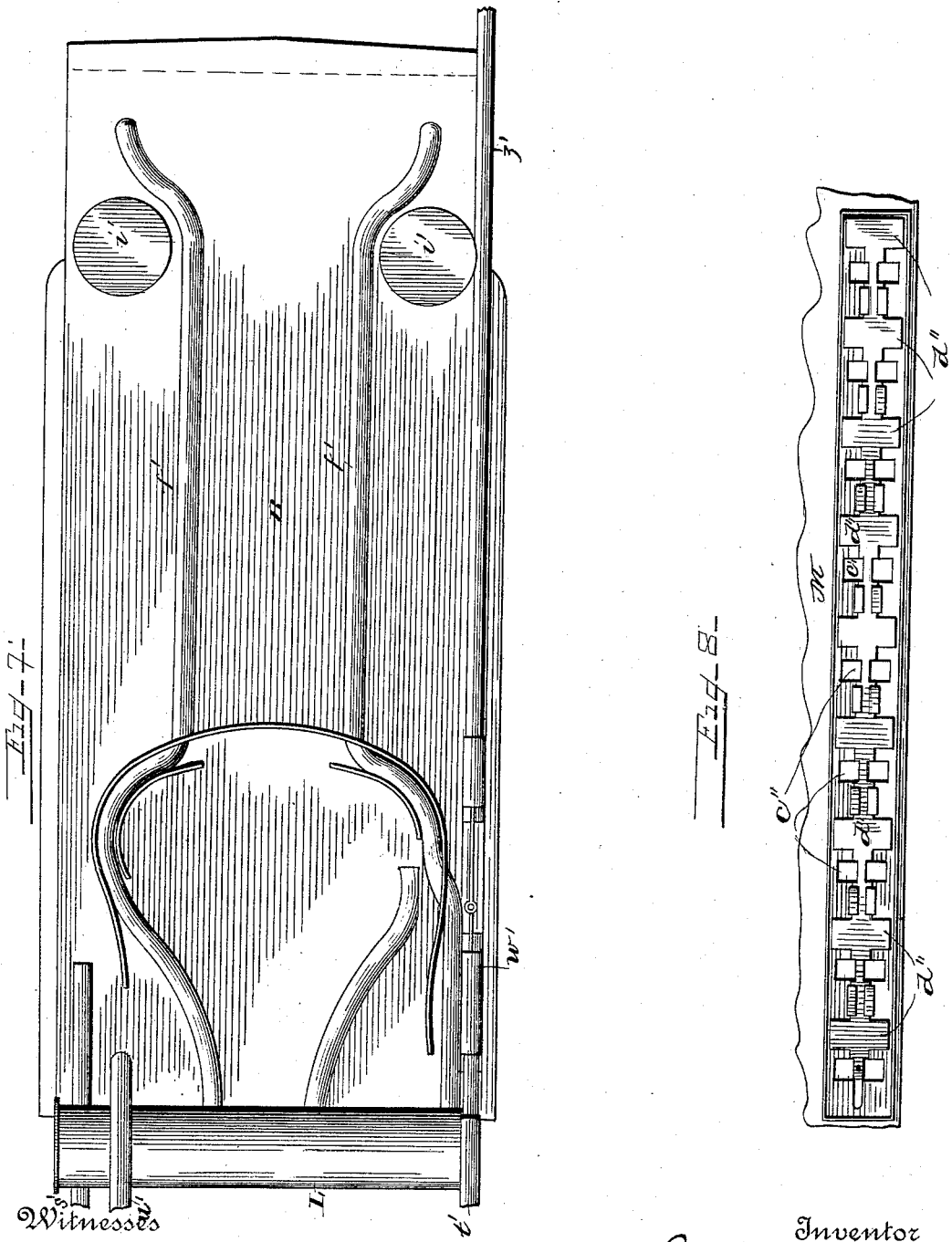

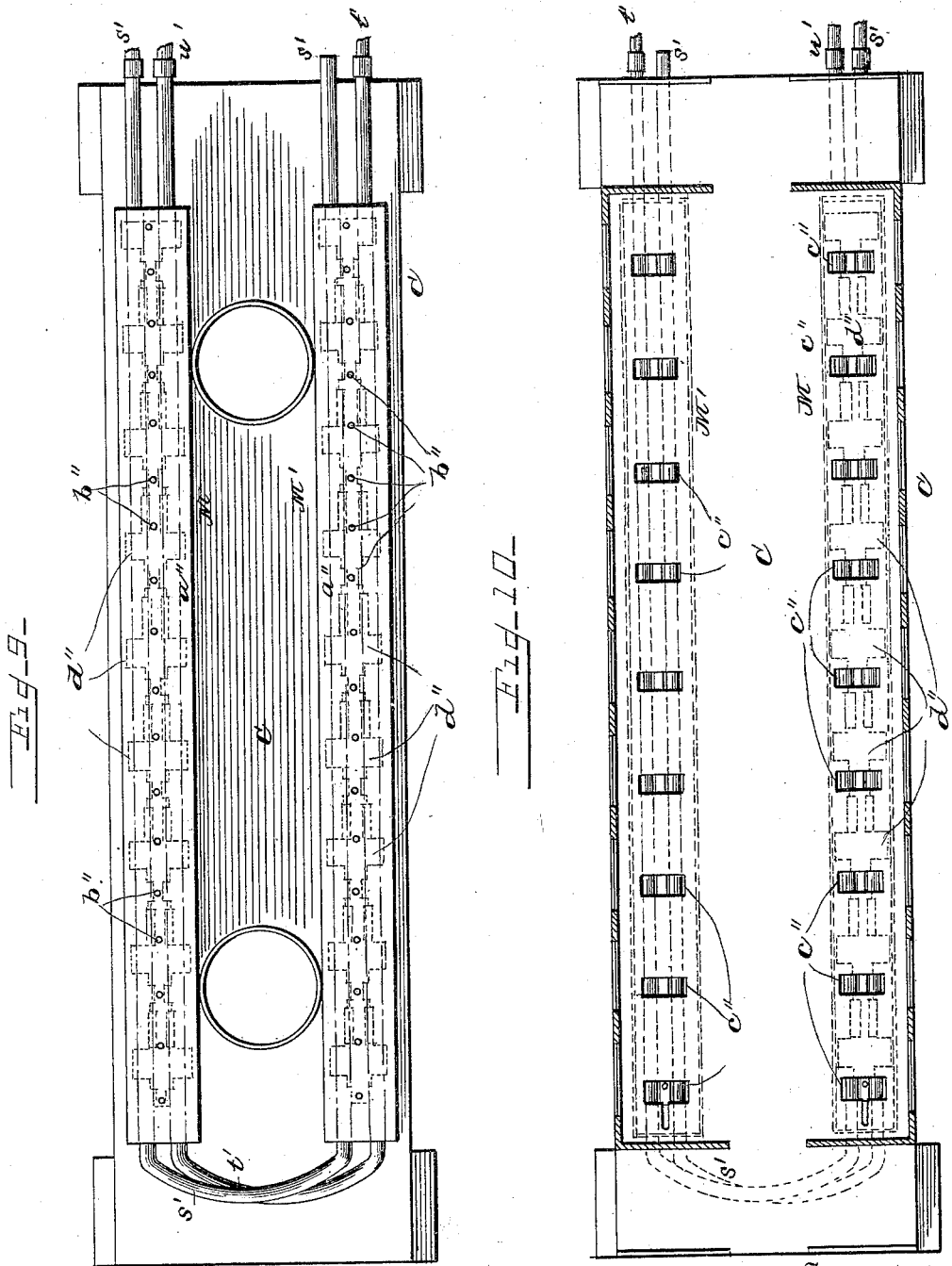

UNITED STATES PATENT OFFICE.

CLARENCE H. UHLER, OF LEBANON, PENNSYLVANIA.

HEATING FEED-WATER.

SPECIFICATION forming part of Letters Patent No. 436,845, dated September 23, 1890.

Application filed July 9, 1890. Serial No. 358,191. (No model.)

*To all whom it may concern:*

Be it known that I, CLARENCE H. UHLER, a citizen of the United States, residing at Lebanon, in the county of Lebanon and State of Pennsylvania, have invented certain new and useful Improvements in Means for Utilizing Waste Heat from Locomotive-Engines for Heating Feed-Water; and I do hereby declare the following to be a full, clear, and exact description of the invention, such as will enable others skilled in the art to which it appertains to make and use the same.

My invention relates to locomotive-engines, and has for its object certain improvements in construction whereby the ordinarily wasted heat from products of combustion and exhaust-steam in the uptake of a locomotive-boiler are utilized for heating feed-water in the tank on the tender and for heating a car or cars.

The invention will be hereinafter described, and particularly pointed out in the claims.

In the accompanying drawings, which form part of this specification, Figure 1 represents a side elevation of a locomotive, a tender, and the front end of a passenger-car equipped with my improvements; Fig. 2, a top plan view of the locomotive; Fig. 3, a front end view with the wheel detached; Fig. 4, a side view of the front end of the engine-boiler, showing a casing applied for protecting the machinery for operating the wheels in the return-pipes; Fig. 5, a vertical section on the line $x\ x$, Fig. 6; Fig. 6, a top plan, partly in section, of the tender; Fig. 7, an inverted plan of the tender; Fig. 8, a bottom plan of the heat-distributing mechanism in the car; Fig. 9, an inverted plan of the car-body, and Fig. 10 a top plan of the car with the seats removed.

Reference being had to the drawings and the letters thereon, A indicates a locomotive-engine, B a tender, and C a passenger-car, all of approved construction and provided with my invention.

On each side of the engine is a pipe $a\ a$, the front end of which enters the uptake of the boiler and is provided with a covering $b$, of wire-gauze, to prevent ingress of solid particles of matter from the furnace.

The rear ends of the pipes $a\ a$ communicate with a valve-case D D on the front end of the tender, and in the pipes are propeller-wheels $c\ c$, mounted upon shafts $d\ d$, for inducing a current of gases from the uptake rearward through the tender and the car.

On the front ends of the shafts $d\ d$ are pulleys $e\ e$, with which a belt $f$ engages. The belt also engages with the main driving-wheel $g$, mounted upon a shaft $h$ and supported upon pedestals $i\ i$.

The front ends of the shafts $d\ d$ are supported upon arms $k\ k$, springing from one of the pedestals $i$, and are provided with collars $l\ l$, which take the thrust of the shaft.

The shaft $h$ is provided with crank-arms $m\ m$, connected by a wrist-pin, to which the pitmen $n\ n$ of two oscillating engines $o\ o$ are connected, and upon the front end of said shaft is secured a wind-wheel E, for imparting motion to the wheels $c\ c$. The shaft $h$ is also provided with clutches $p\ q$, the former for throwing the engines $o\ o$ into gear when the locomotive is not in motion and the latter for throwing the wind-wheel E into gear when the locomotive is running.

The engines $o\ o$ are supplied with steam from the locomotive-boiler through pipe $r$, controlled by valve $s$, and the clutches thrown into and out of engagement by the rod $t$, lever $u$, and sliding sleeve $v$.

The machinery in front of the boiler, except the wheel E, is incased by a removable hood F to protect it from the elements, and a door $w$ is placed in the side of the uptake to facilitate the removal of cinders arrested therein.

The rear ends of the pipes $a\ a$ are connected to the valve-case D by a flexible section $a'$, having a coupling $b'$. The case D is provided with an inlet-pipe $c'$, a discharge-pipe $d'$, opposite the inlet-pipe, a valve G, having a side orifice or port $e'$ and an open lower end, and a pipe $f'$, connected to the bottom of the valve-case, for conducting the waste gases rearward to a car or a train of cars when the engine is at rest and the heat of the gases is not required to heat the feed-water in the tank H of the tender.

To the upper surface or head of the valve G is secured a rod $g'$, by which the valve is manipulated to cause the gases to flow to the car, as indicated, or through the pipe $d'$ into the receiving and separating chamber I, which chamber is provided with a vertical diaphragm $h'$, of wire-gauze or perforated sheet metal, against which any solid matter carried through the pipe $a$ impinges and is precipitated to the bottom of said chamber, from which it is removed by taking off the detachable cover $i'$.

Within the tank H are two concentric coils K K, into which the hot gases and steam which have passed through the diaphragms $h'$ are conducted by pipes $k'$, leading to the inner coil, and $l'$, leading to the outer coil, and after having passed through the coils the gases are conducted through pipes $m'$ $n'$ into a receiving-chamber L on the rear end of the tender, from which they are conducted to the heating-chambers M M' under a car or a series of cars composing a train.

The coils K K are wound around supporting-frames $o'$ $p'$, composed of a series of vertical bars $q'$, secured at their ends to rings $r'$, and are attached to the frames by lashing, as at $r''$, or in any suitable manner.

The receiving-chamber L is connected to the heating-chamber M by a pipe $s'$, which conducts the gases and steam from the uptake through said chamber and the chamber M' and discharges into the atmosphere after having made the circuit and done its work in heating a car. Instead of making the pipe cross at the rear of the first car it may be continued throughout the length of a train of cars having chambers M and made to return through a series of chambers M'.

When the train is not in motion, hot water from the tank H on the tender may be forced through the pipe $t'$, chamber or chambers M', and returned through chamber or chambers M to the tank through pipe $w'$. The water is forced and circulated from the tank through the heating-chambers and returned by a steam-pump $w'$, attached to the tender and and supplied with steam through pipe $y'$.

The heating-chambers M M' are provided with removable covers $a''$, through the ends of which extend the pipes $s'$, $t'$, and $w'$, and in said covers are perforations $b''$, to effect the escape of any water of condensation on the outside of the pipes and to admit air to said heating-chambers to be heated and discharged into the car through the openings $c''$ in the floor of the car, controlled by a sliding valve or damper $d''$.

The heated water from the tank on the tender is supplied to the boiler in the usual manner and by any approved means.

When a train is in motion, the valve G is in the position shown in Fig. 6, when the gases and steam will pass through the separating-chamber I into the coils K K and heat the water in the tank H. When it is desired to direct the gases and steam to the cars to heat them, the valve G is raised and the port $e'$ made to register with the pipe $c'$, when the gases will pass down through the valve and on through pipe $f'$, receiving-chamber L, pipe $s'$, and chambers M M' to the atmosphere through the open end of pipe $s'$ at the front of the first car in the train.

By the construction shown the gases from the furnace and the exhaust-steam from the engine-cylinders are utilized to heat feed-water for the boiler and to heat a car or cars in a train.

Having thus fully described my invention, what I claim is—

1. The combination, with the uptake of a locomotive-boiler, of pipes for conducting the waste gases and steam, provided with propellers for inducing a current of said gases, a motor, a heating-pipe in the tank on the tender, and a valve for controlling the flow of the gases, substantially as described.

2. The combination, with the uptake of a locomotive-boiler, of pipes for conducting waste gases and steam, a valve-case having an inlet and a plurality of discharge-pipes, a valve constructed to control the passage of fluids above and below it, and suitable heat-conducting pipes, substantially as described.

3. The combination, with the uptake of a locomotive-boiler, of pipes for conducting waste gases and steam, a valve for controlling and directing the course of the gases, a receiving and separating chamber, and suitable heat-conducting pipes, substantially as described.

4. The combination, with the uptake of a locomotive-boiler, of pipes for conducting waste gases and steam to the tender and a car, a valve for controlling and directing the course of the gases, a receiving and separating chamber provided with a foraminous diaphragm and in communication with the valve-case, and suitable heat-distributing pipes, substantially as described.

5. The combination, with the uptake of a locomotive-boiler, of pipes for conducting waste gases and steam, a valve, a receiving and separating chamber, and a coil in the tank on the tender for heating the water in said tank, substantially as described.

6. The combination, with a locomotive-tender and a heating-coil therein, of a frame for supporting said coil, consisting of a series of vertical bars connected at their ends to rings, substantially as described.

7. The combination, with pipes for conducting waste gases and steam from the uptake of a locomotive-boiler, of a coil through which said gases are conducted, a receiving-chamber communicating with said coil, heat-distributing pipes, a chamber through which said pipes pass, and a valve for controlling the discharge of heat from said chamber, substantially as described.

8. The combination, with pipes for conducting waste gases and steam from the uptake of a locomotive-boiler, of a valve-case and a valve, pipes for conveying said gases through a coil to heat water in the tank, pipes for conveying said gases directly to a receiving-chamber, and suitable distributing-pipes, substantially as described.

9. The combination of pipes for conducting waste gases and steam from the uptake of a locomotive-boiler, a valve for controlling and directing the course of said gases into or beyond the tank of the tender, and suitable pipes for circulating a heating-fluid, substantially as described.

10. The combination, with pipes and propellers for conducting and inducing a current of waste gases and steam from the uptake of a locomotive-boiler, of a motor, suitable shipping mechanism, a valve for directing the gases into or beyond the tank of the tender, and pipes for distributing the gases, substantially as described.

In testimony whereof I affix my signature in presence of two witnesses.

CLARENCE H. UHLER.

Witnesses:
J. W. EUSTON,
F. H. REINOEHL.